US010366567B2

(12) United States Patent
Bruzzese et al.

(10) Patent No.: US 10,366,567 B2
(45) Date of Patent: Jul. 30, 2019

(54) COMPUTER IMPLEMENTED FRAMEWORKS AND METHODOLOGIES FOR VIRTUALIZATION OF LINKED GAMING

(71) Applicant: Ainsworth Game Technology Limited, Newington (AU)

(72) Inventors: Vincent Carmelo Bruzzese, Oatlands (AU); Scott Paul Shelley, Heathcote (AU); Baheerathan Gnanasundram, Wentworthville (AU); Patrick Tan, Wentworthville (AU); Bronislav Paykin, Mentone (AU); Lee Howard Weekes, Sydney (AU); Peter Scott Cameron, Manly Vale (AU)

(73) Assignee: Ainsworth Game Technology Limited, Newington, NSW (AU)

(*) Notice: Subject to any disclaimer, the term of this patent is extended or adjusted under 35 U.S.C. 154(b) by 149 days.

(21) Appl. No.: 15/185,903

(22) Filed: Jun. 17, 2016

(65) Prior Publication Data

US 2016/0300448 A1 Oct. 13, 2016

Related U.S. Application Data

(63) Continuation of application No. 13/791,243, filed on Mar. 8, 2013, now Pat. No. 9,373,222.

(51) Int. Cl.
*G06F 17/00* (2019.01)
*G07F 17/32* (2006.01)

(52) U.S. Cl.
CPC ................................ *G07F 17/3258* (2013.01)

(58) Field of Classification Search
USPC ........................................ 463/25, 26, 27, 28
See application file for complete search history.

(56) References Cited

U.S. PATENT DOCUMENTS

| | | | | |
|---|---|---|---|---|
| 8,628,398 | B2 | 1/2014 | Ellis | |
| 2005/0079911 | A1* | 4/2005 | Nakatsu | G07F 17/32 463/26 |
| 2006/0166731 | A1* | 7/2006 | Yoshimi | G07F 17/3211 463/20 |
| 2007/0060321 | A1 | 3/2007 | Vasquez et al. | |
| 2007/0149267 | A1 | 6/2007 | Ross et al. | |
| 2008/0076540 | A1 | 3/2008 | Aida | |

OTHER PUBLICATIONS

Codespace Gaming Progressive Controller, 1 page (2010).

* cited by examiner

*Primary Examiner* — Paul A D'Agostino
(74) *Attorney, Agent, or Firm* — Cook Alex Ltd.

(57) ABSTRACT

In overview, the technology is primarily directed to the implementation of linked gaming in respect of a plurality of gaming machines. In particular, a controller device is disclosed, this controller device being adapted to enable the management of a plurality of linked games via a single piece of hardware. This is achieved in part by virtualization of jackpot controllers within the controller device. More specifically, a user is enabled to configure a plurality of virtual jackpot controllers by way of interaction with a graphical user interface, and select compatible electronic gaming machines to participate in a linked game provided by a given one of the virtual jackpot controllers.

19 Claims, 5 Drawing Sheets

COMPUTER IMPLEMENTED FRAMEWORKS AND METHODOLOGIES FOR VIRTUALIZATION OF LINKED GAMING

BACKGROUND

The present invention relates, at least in some embodiments, to computer implemented frameworks and methodologies for virtualization of linked gaming. Embodiments of the invention have been particularly developed for enabling multiple independent groups of linked games to be configured, managed and implemented using a single controller device. While some embodiments will be described herein with particular reference to that application, it will be appreciated that the invention is not limited to such a field of use, and is applicable in broader contexts.

Any discussion of the background art throughout the specification should in no way be considered as an admission that such art is widely known or forms part of common general knowledge in the field.

Linked gaming, in the context of electronic gaming machines (such as machines commonly referred to as "slot machines" or "poker machines") is well known. In overview, multiple machines, which are operated individually, compete collectively for prizes via a linked jackpot controller. Common categories of linked games include standard progressive jackpots, wherein a linked jackpot prize is awarded in response to a predefined game result being realized at an individual machine, and mystery progressive jackpots, where a jackpot is awarded to an individual machine in response to a selection process (for example a random selection or a contribution-based selection).

Presently, configuration and implementation of linked gaming is complicated and, often requires multiple individual linked jackpot controllers. There is a need in the art for computer implemented frameworks and methodologies for virtualization of linked gaming.

SUMMARY

It is an object of the present invention to overcome or ameliorate at least one of the disadvantages of the prior art, or to provide a useful alternative.

One embodiment provides a computer-implemented method for enabling configuration of a plurality of linked games, the method being performed by a controller device that is in communication with a plurality of electronic gaming machines, including:

- providing a user interface thereby to enable a. user to configure a plurality of virtual jackpot controllers, wherein configuring a given one of the virtual jackpot controllers includes receiving, from the user, data indicative of a linked game selected from a set of available linked games;
- for each of the virtual jackpot controllers:
- identifying a set of the plurality of electronic gaming machines that are compatible with the selected linked game; and
- providing, via the user interface, controls thereby to enable a user to selectively associate one or more of the identified set of electronic gaming machines with the virtual jackpot controller; and
- configuring the virtual jackpot controller to provide its selected linked game in respect of its associated electronic gaming machines; and
- simultaneously executing the respective linked games of each of the plurality of virtual jackpot controllers in respect of their associated gaming machines.

One embodiment provides a controller device configured to provide a plurality of linked games, the controller device being in communication with a plurality of electronic gaining machines, the device including:

- a display screen configured to provide a user interface;
- a memory module containing computer executable code that, when executed via a processor of the device, configured the device to perform a method including:
- providing, via the user interface, controls thereby to enable a user to configure a plurality of virtual jackpot controllers, wherein configuring a given one of the virtual jackpot controllers includes receiving, from the user, data indicative of a linked game selected from a set of available linked games;
- for a given one of the virtual jackpot controllers. identifying a set of the plurality of electronic gaining machines that are compatible with the selected linked game; and
- providing, via the user interface, controls thereby to enable a user to selectively associate one or more of the identified set of electronic gaming machines with that virtual jackpot controller; and
- configuring each virtual jackpot controller module to execute its selected linked game in respect of its associated electronic gaming machines.

One embodiment provides a controller device configured to provide a plurality of linked games, the controller device being in communication with a plurality of electronic gaming machines, the device including:

- a display screen configured to provide a user interface;
- game data for a plurality of linked games;
- a user interface module for enabling a user to select one of the linked games for execution;
- display data for the plurality of linked games; and
- a display driver for providing an output signal indicative of the display data for the selected one of the linked games.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION OF VARIOUS EMBODIMENTS

Figure 1:
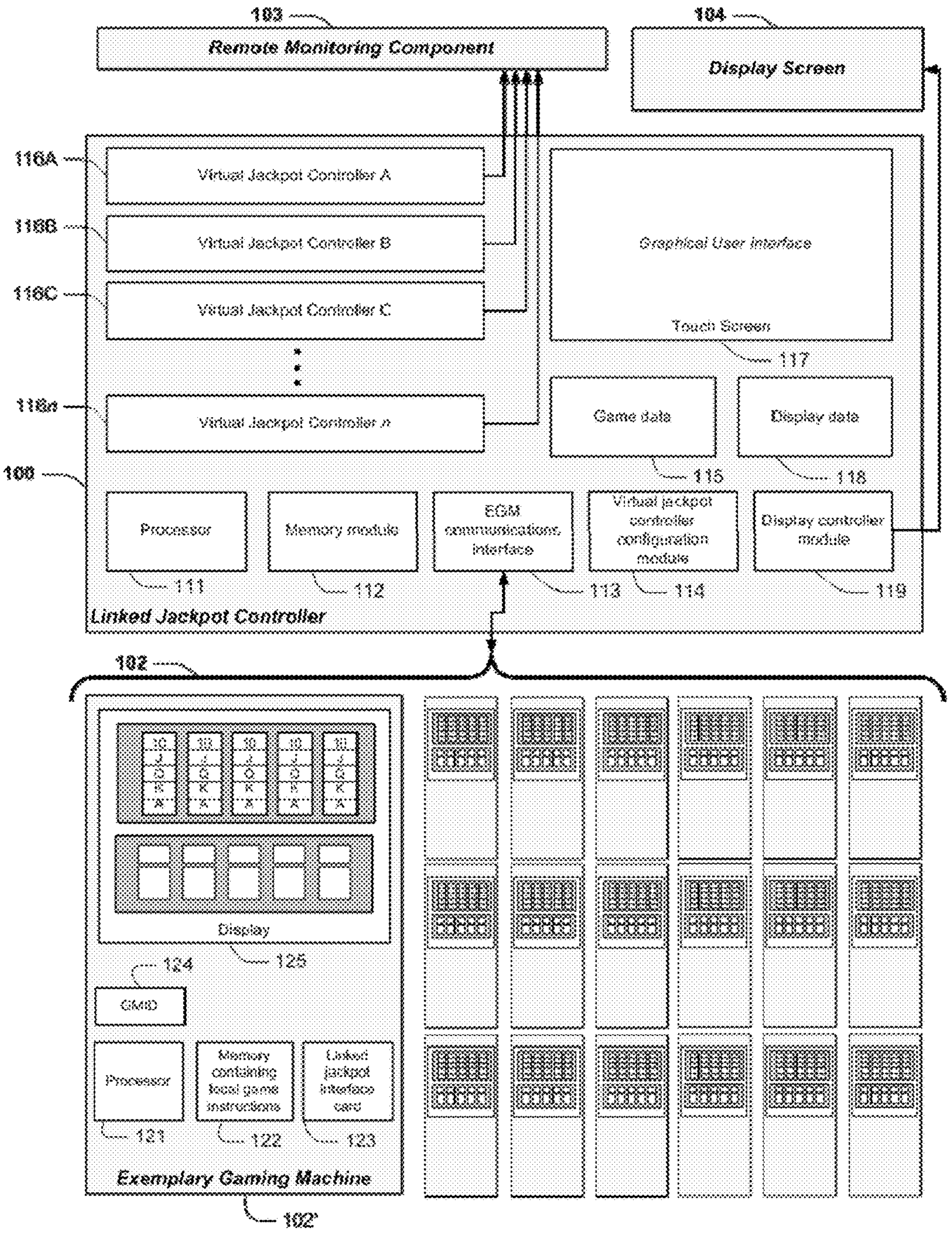
FIG. 1 schematically illustrates a jackpot controller device according to one embodiment, illustrated in combination with other components in a gaming framework.

Described herein are computer implemented frameworks and methodologies for virtualization of linked gaming. In overview, the technology is primarily directed to the implementation of linked gaming in respect of a plurality of gaming machines. In particular, a controller device is disclosed, this controller device being adapted to enable the management of a plurality of independent groups of linked games via a single piece of hardware. This is achieved in part by virtualization of jackpot controllers within the controller device. More specifically, a user is enabled to configure a plurality of virtual jackpot controllers by way of interaction with a graphical user interface, and select compatible electronic gaming machines to participate in an independent link group provided by a given one of the virtual jackpot controllers.

One embodiment provides a computer-implemented method for enabling configuration of a plurality of independent linked groups, the method being performed by a controller device that is in communication with a plurality of electronic gaming machines. The method includes providing a user interface thereby to enable a user to configure a plurality of virtual jackpot controllers. Configuring a given one of the virtual jackpot controllers includes receiving, from the user, data indicative of a linked game selected from a set of available linked games (software instructions for which being preferably maintained in memory associated with the controller). The method additionally includes, for each of the virtual jackpot controllers, automatically identifying a set of the plurality of electronic gaming machines that are compatible with the selected linked game. This is preferably achieved by accessing data available via linked game interface modules installed at the electronic gaining machines. The method then includes providing, via the user interface, controls thereby to enable a user to selectively associate one or more of the identified set of electronic gaming machines with the virtual jackpot controller. Based on this association, the virtual jackpot controller is configured to provide its selected linked game in respect of its associated electronic gaming machines. The controller simultaneously executes the respective linked games of each of the plurality of virtual jackpot controllers in respect of their associated gaming machines.

As used herein, the term "virtual jackpot controller" refers to a software component that executes software instructions indicative of a linked jackpot game based upon a predefined set of operational parameters and in respect of a set of gaming machines. Typically, the set of gaining machines is a subset of a plurality of gaming machines that are connected to the physical device on which the virtual jackpot controller executes. Furthermore, multiple virtual jackpot controllers may be executed using common hardware, each operating with a respective subset of the plurality of gaming machines. Preferably each virtual jackpot controller is individually presented externally of the hardware device as a discrete jackpot component (for example as would a traditional physical linked jackpot controller).

As used herein, the term "linked game" refers to a game that is executed at a jackpot controller (or virtual jackpot controller) on the basis of software instructions, being a game that is influenced by input from a plurality of EGMs. For example, EGMs include respective interface cards that are compatible with a particular linked game, and this enables the EGMs to interact with (which includes, in some embodiments, engaging in two-way communication with) the linked game executing at a jackpot controller (or virtual jackpot controller).

Exemplary Framework

FIG. 1 illustrates an exemplary framework. In overview, this framework includes a linked jackpot controller 100 according to one embodiment, which is in communication with a plurality of electronic gaming machines (EGMs) 102, including an exemplary EGM 102'. It will he appreciated that the number of EGMs 102 is representative only, and that in practice there may be a significantly greater number of EGMs in communication with controller 100 than are illustrated in FIG. 1.

Controller 100 is illustrated by reference to a selection of hardware components and functional components. It will be appreciated that these are not intended to define an exclusive sot of components, and are selected thereby to provide a logical visual representation of controller 100 thereby to facilitate visualization of key features and functionalities.

Controller 100 includes at least one processor 111 coupled to a memory module 112. In this manner, processor 111 is configured to executed computer executable code (software instructions) maintained on memory module 112 thereby to provide functionality to controller 100. Examples of such functionalities are discussed further below. Controller 100 additionally includes an EGM communications interface 113, which enables controller 100 to communicate with EGMs 102. For example, this may include one or more Ethernet network interfaces or the like. In one embodiment each EGM communicates with controller 100 via an interface card connected via CAT 5 Ethernet cables to a Power over Ethernet switch (eliminating the requirement for an EGM power source for each Interface Card).

Software instructions maintained on memory module 112 include software instructions for enabling execution of a virtual jackpot configuration module 114. Module 114 enables the creation and management of a plurality of virtual jackpot controllers 116A to 116*n*. In the present embodiment a user is enabled to interact with module 114 by way of a graphical user interface presented on a touch screen display 117. In other embodiments the user interface is presented via alternate arrangements, for example at a separate device, which in some embodiments may be achieved by way of a browser-based interface rendered in a web-browser of a client terminal based on HTML code delivered by controller 100. Operation of module 114 is discussed in detail further below.

Controller 115 includes a repository of game data 115, which includes software instructions for a plurality of linked games. In some embodiments game data 115 is defined within memory module 112. The plurality of linked games for which software instructions are maintained in game data 115 define a collection of available linked games that may be implemented via the virtual jackpot controllers (by way of interaction with interface cards installed at the individual EGMs). For each available linked game, the game data includes software instructions for enabling execution of the game (or a reference to a location from which such software instructions are obtainable). This enables implementation of game rules, comparators, and/or other linked game software components.

In the context of configuring a virtual jackpot controller, in some embodiments a user selects:

- a desired linked game (for example either a specified standard progressive jackpot, or a mystery jackpot); a predefined game variation for the desired linked game (for example defined by reference to Return to Player Percentage, denomination, or the like)
- selectable game parameters (for example jackpot levels and the like).

Preferably a resource (such as a user manual) is provided thereby to inform a user of identifiers for each game variation, thereby to enable a user to identify the unique game identifier for a desired linked game. In some embodiments the user interface provides controls thereby to enable a user to set/modify additional game parameters for a given linked game (for example jackpot levels and the like).

Preferably the set of available linked games include both standard progressive jackpot games and mystery progressive jackpot games. As used herein, these terms are used based on the following definitions:

- A standard progressive jackpot game is a linked game whereby a winner is identified based on a game result in a local game executing at a given one of the participating EGMs. For example, in the case of a slot machine, a jackpot win may be triggered by the realization of a specified combination of symbols at a given one of the local machines.
- A mystery progressive jackpot is a linked game whereby a winner is identified based on a selection process performed by the linked game itself. For example, a winning machine may be identified subject to a randomized process conducted from within the linked game, or based on a process that identifies a machine responsible for causing a progressive jackpot meter to reach a trigger value.

Controller 100 is configured to enable a combination of standard and mystery progressive jackpot games to be provided simultaneously. For example, in some configurations at least one of the virtual jackpot controllers is configured to provide a standard progressive jackpot linked game, and at least one of the virtual jackpot controllers is configured to provide a mystery progressive jackpot linked game.

Controller 100 additionally includes a repository of display data 118, which includes for all or a subset of the available linked games, display data for that those games. The display data is executable via a display controller module 119 thereby to provide output to a graphical display device (such as display screen 104) remote of the controller device (for example via a DVI output to a LCD display). In this manner controller 100 is enabled to perform both functionalities of a jackpot controller and a display controller (which are conventionally provided by separate hardware components). In some embodiments multiple display controller modules are provided thereby to enable simultaneous output of multiple sets of display data to respective display devices. In some cases a common stream of display data output is delivered to multiple display devices (for example using multiple output ports, video splitters and the like).

FIG. 1 illustrates an exemplary gaming machine 102' in the group of gaming machines 102. EGM 102' includes a processor 121 coupled to a memory module 122 that maintains software instructions for a local game (being a game played locally by a user of machine 102'). A display 125 provides a graphical representation of the local game, which may be a slot game or the like. EGM 102' includes additional components (for example other components relevant to the execution of the local game), which are not illustrated in the interests of simplicity.

EGM 124 is identifiable by way of a Gaming Machine Identifier (GMID) 124, which allows unique identification of EGM 102' (relative to others of EGMs 102).

A linked jackpot interface card 123 is installed in EGM 102' (and in each of gaming machines 102). Interface card 123 enables interaction between machine 102' and controller 100. For example, the interface card connected via CAT 5 Ethernet cables to a Power over Ethernet switch (eliminating the requirement for an EGM power source for each interface card), thereby to enable networked communication between the interface card and controller 100. Controller 100 in this manner is able to determine the GMID for the machine and characteristics of the interface card, importantly characteristics that define linked games that the card is configured to provide. In some cases each interface card is configured only to enable a single linked game (for example a specific standard progressive jackpot having one or more defined operational characteristics, such as a defined hit probability of a progressive jackpot winning combination in the local game).

Software and FPGA code on the Interface Cards can be uploaded/updated remotely from the device 100. This means that any changes/bug fixes or enhancements to the interface card software can be implemented in a streamlined manner by providing updated software to device 100 for download to the individual interface cards. This removes the need to physically access the interface cards to change the software.

In a further embodiment a Wide Area Network is used thereby to enable EGMs (and in some cases controllers) located at physically distinct locations to participate in a common linked game provided by a virtual jackpot controller of device 100.

In some embodiments multiple devices 100 are operated, for example by providing a primary device and a redundant backup device, which may be configured to act as master and slave. Should the master fail the slave is configured to take over and keep the linked jackpot system running (preferably with zero downtime).

Exemplary Virtual Jackpot Controller Configuration Method

Figure 2:
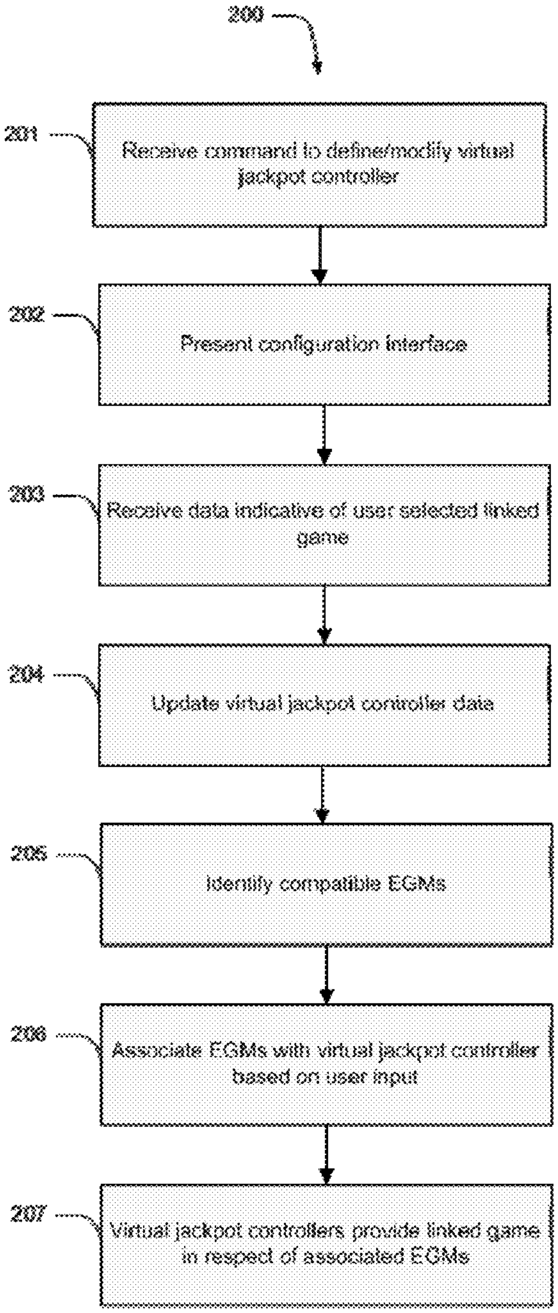
FIG. 2 illustrates a computer implemented method according to one embodiment.

Controller 100 is configured to perform computer-implemented method for enabling configuration of a plurality of linked games. An exemplary method is illustrated as method 200 of FIG. 2. It will be appreciated that this method may be subjected to various modifications, for example dependent of detailed aspects of user interface design.

Functional block 201 represents a process including receiving a command to define a new virtual jackpot controller, in some cases, a command (or modify an existing virtual jackpot controller). For example, this may result from a user interacting with a control object defined in the graphical user interface displayed on screen 117. Controller 100 is configured to support up to a predefined maximum number of virtual jackpot controllers, with predefined maximum preferably being greater than or equal to (8) eight (or more preferably greater than or equal to 12). Each virtual jackpot controller is also configured to support up to a predefined maximum number of prize levels, with the predefined maximum preferably being greater than or equal to 4 (or more preferably greater than or equal to 8). In practice, the maximum is in some cases limited predominately by available computing and network resources, and/or regulatory requirements.

Functional block 202 represents a process including presenting a configuration interface. For example, this may include providing via the user interface controls thereby to enable a user to configure a plurality of virtual jackpot controllers. Based upon those interface controls, functional block 203 represents a process including receiving, from the user, data indicative of a linked game selected from a set of available linked games. This may additionally include the selection of operational parameters for the linked game, such as jackpot levels and the like. In response to this user input, virtual jackpot controller data is updated at 204.

Functional block 205 represents a process including, for a given one of the virtual jackpot controllers, identifying compatible EGMs. Data indicative of compatibility is presented to a user thereby to enable a user to associate EGMs with virtual jackpot controllers based on user input at 206. In some cases this is performed on a virtual jackpot controller specific level, whereby a virtual jackpot controller is selected, EGMs compatible with that virtual jackpot controller displayed (for example by GMID), and a user designates which of the EGMs are to be associated with that virtual jackpot controller. In some cases, the interface instead displays all compatible virtual jackpot controllers for a given EGM, and the user determines with which (if any virtual jackpot controller to associate that EGM.

The association at 206 configures the virtual jackpot controller in question to provide its selected linked game in respect of its associated EGMs. As represented by functional block 207, controller 100 simultaneously executes the respective linked games of each of the plurality of virtual jackpot controllers in respect of their associated EGMs. For a given linked game may include the likes of:

- Monitoring turnover and/or other data at the associated EGMs.
- Applying game rules thereby to identify prize triggers and winning EGMs.
- Providing data to interface cards thereby to award prizes, drive a local linked game display at the EGM, and so on.

In some embodiments a remote monitoring component 103 monitors the operation of each of the virtual jackpot controllers 116A to 116*n*. In this regard, each virtual jackpot controller preferably presents itself to external devices as would an individual physical jackpot controller. In this regard, controller 100 is preferably configured to maintain n individual unique jackpot controller identifiers, which are respectively associated with virtual jackpot controllers upon creation.

FIG. 3A to FIG. 3F illustrate screenshots according to an exemplary embodiment. These are provided for purposes of explanation only, and should not be regarded as limiting in any way.

Figure 3A:
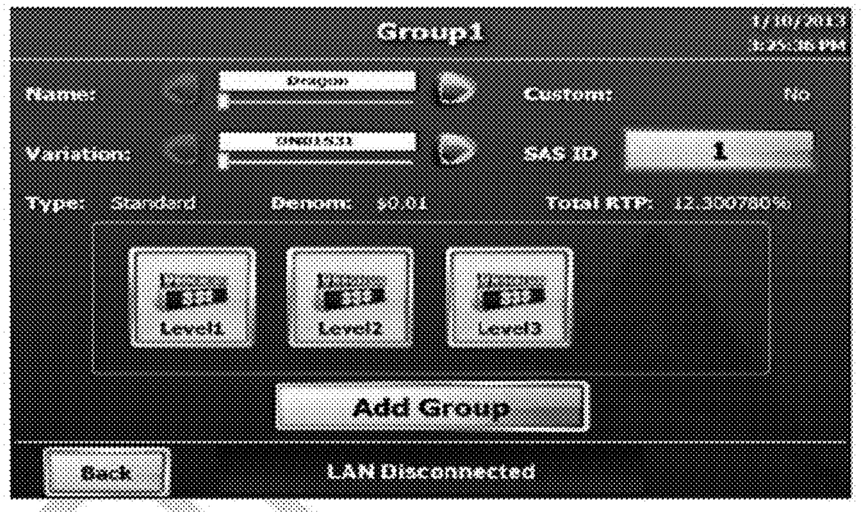
FIG. 3A to FIG. 3F illustrate screenshots according to an exemplary embodiment.
Figure 3B:
Figure 3C:
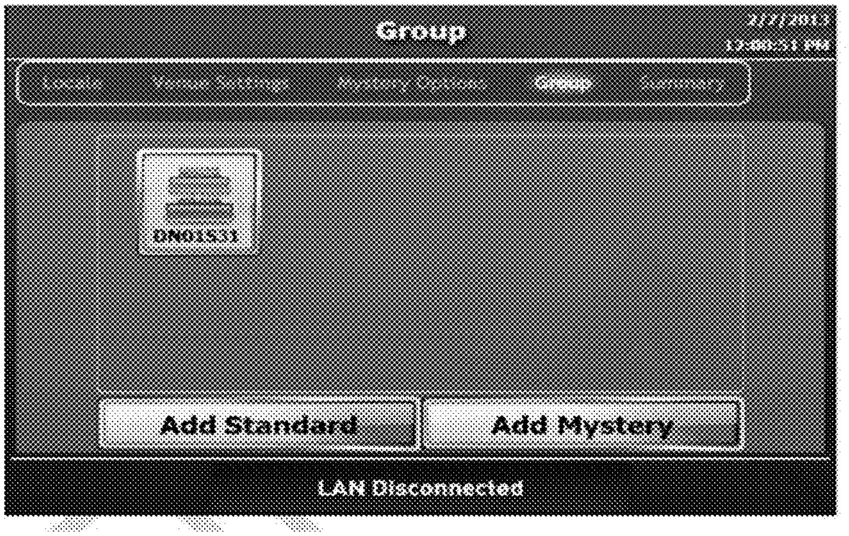

FIG. 3A illustrates a screenshot relating to the configuration of a virtual jackpot controller called “Group1”. A game selection interface has been used to select a standard progressive jackpot linked game called “Dragon”, and a variation of that game called “DN01531”, which defines a denomination of $0.01 and total return to player (RTP) of 12.300780%. The game has three jackpot levels (Level1, Level2 and Level3), which are configurable using a screen such as that shown in FIG. 3B. Once the virtual jackpot controller configuration is complete, it is shown in a screen such as that of FIG. 3C, which includes controls to enable the creation of an additional standard progressive jackpot or mystery progressive jackpot.

Figure 3D:
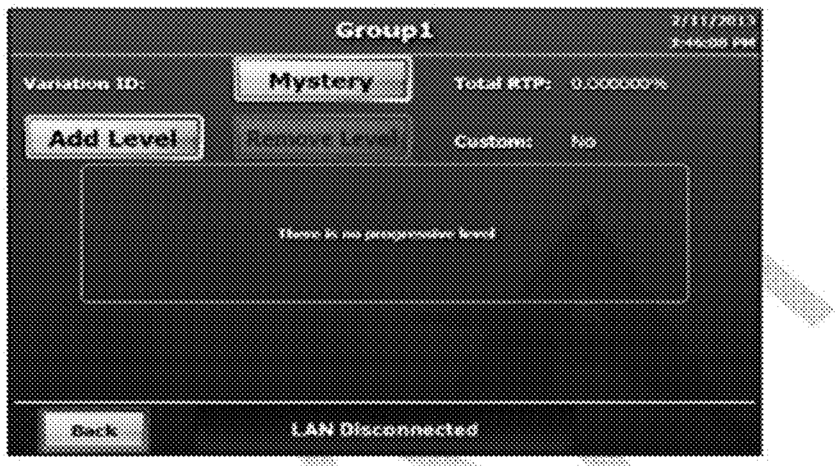
Figure 3E:
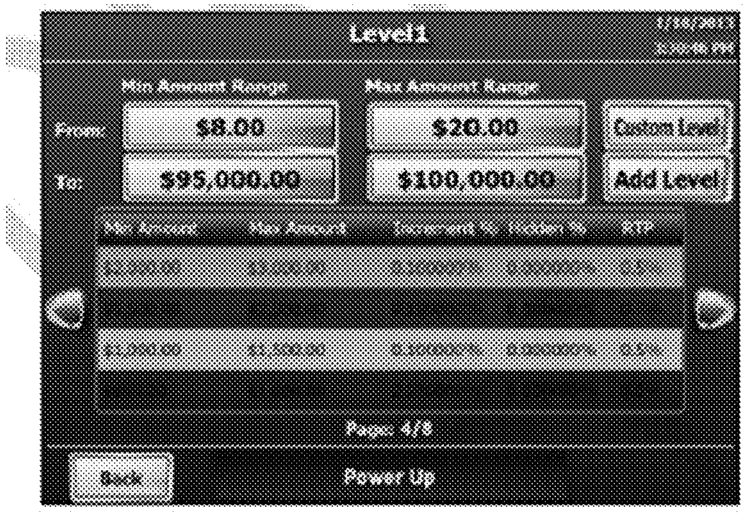

FIG. 3D illustrates an exemplary screen for the creation and customization of a new mystery progressive jackpot. At the time of FIG. 3D, no jackpot levels are defined, and an “Add Level” control is used to progress to the screen of FIG. 3E thereby to define operational Characteristics for a mystery progressive jackpot level (such as low-end and high-end values, increment properties, and so on). Those skilled in the art will be familiar with the configuration of mystery progressive jackpots.

Figure 3F:
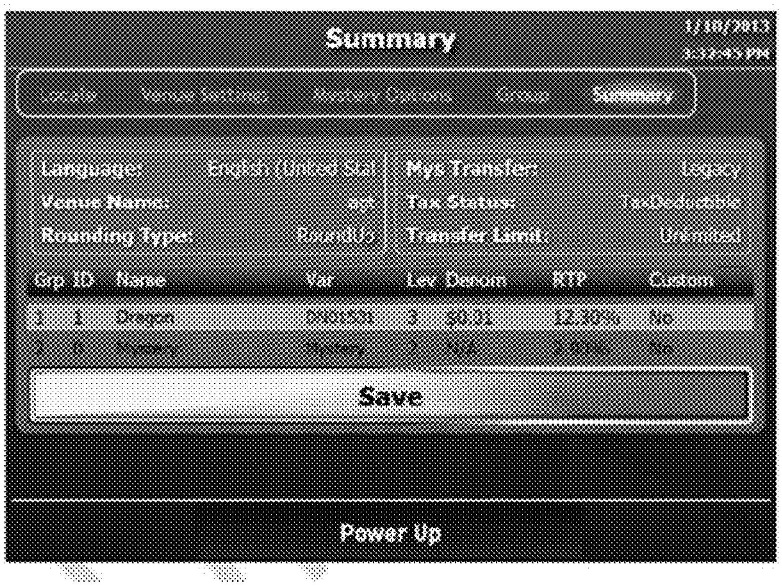

FIG. 3F illustrates an exemplary summary screen showing details for two user-defined virtual jackpot controllers (“Dragon” and “Mystery”), and provides an option for the user to save those groups. Upon saving the groups a user is enabled to associate individual EGMs with each of the groups such that the relevant linked games are able to be executed by controller 100 in respect of those machines, thereby to functionally provide the linked games to users of the EGMs.

CONCLUSIONS AND INTERPRETATION

It will be appreciated that the disclosure above provides various significant frameworks and methodologies for virtualization of linked gaming, for example in the context of a jackpot controller that supports virtual jackpot controllers, and software/methods operable via such a controller. Numerous practical advantages will be recognized, for example:

- Cost considerations, in terms of being able to operate multiple jackpots out of a single hardware device.
- Flexibility to associate individual EGMs with desired virtual jackpot controllers based on user preferences, and modify such associations over time.
- Convenience in identifying compatible EGMs, by virtue of the use of interface cards that present data indicative of compatibility to the virtual jackpot controller.
- The ability to provide a controller that has a wide range of inked games pre-installed (and optionally display data for those games also pre-installed).
- The combination of jackpot control and display control into a single hardware unit.

Unless specifically stated otherwise, as apparent from the following discussions, it is appreciated that throughout the specification discussions utilizing terms such as “processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium carrying computer-readable program code embodied in the medium.

It will be understood that the steps of methods discussed are performed in one embodiment by an appropriate processor (or processors) of a processing computer) system executing instructions computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG. or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include so but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms “coupled” and “connected,” along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. “Coupled” may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer-implemented method for enabling configuration of a plurality of virtual jackpot controllers, the method including:

maintaining, at a controller in communication with a plurality of electronic gaming machines, data representing a selection of a linked game for each of a plurality of virtual jackpot controllers, the linked game selected from a set of available linked games;

automatically identifying, at the controller, a set of the plurality of electronic gaming machines that are compatible in that the electronic gaming machines are equipped with hardware to interact with the linked game selected for each of the plurality of virtual jackpot controllers from a group of electronic gaming machines equipped with hardware to interact with the linked game selected for each of the plurality of virtual jackpot controllers and electronic gaming machines not equipped with hardware to interact with the linked game selected for each of the plurality of virtual jackpot controllers, at least one set including one or more compatible electronic gaming machines that are not associated with the virtual jackpot controller, receiving, at the controller, one or more selections of one or more electronic gaming machines to be associated with one of the plurality of virtual jackpot controllers after the set of the plurality of electronic gaming machines that are compatible with the one of the plurality of virtual jackpot controllers is automatically identified; and simultaneously executing, at the controller, selected linked games of each of the plurality of virtual jackpot controllers in respect of the associated electronic gaming machines.

2. A method according to claim 1, further comprising causing, via the controller, either the set of the plurality of electronic gaming machines that are compatible with the selected linked game for one of the virtual jackpot controllers or a set of virtual jackpot controllers having linked games for which one of the electronic gaming machines is compatible to be displayed.

3. A method according to claim 1, wherein the set of available linked games includes at least one standard progressive jackpot and at least one mystery progressive jackpot.

4. A method according to claim 3, wherein at least one of the plurality of virtual jackpot controllers is configured to provide a standard progressive jackpot linked game, and at least one of the plurality of virtual jackpot controllers is configured to provide a mystery progressive jackpot linked game.

5. A method according to claim 1, wherein the controller includes a repository of game data including game data for the set of available linked games.

6. A method according to claim 1, wherein data indicative of the linked game is maintained and includes data indicative of a game type and data indicative of game operational parameters.

7. A method according to claim 6, further comprising receiving, at the controller, a unique identifier for a linked game having the game type and the game operational parameters.

8. A method according to claim 1, wherein the controller is configured to simultaneously maintain data indicative of up to n virtual jackpot controllers, wherein $n \geq 4$.

9. A method according to claim 1, wherein automatically identifying a set of the plurality of electronic gaming machines that are compatible with the selected linked game includes determining characteristics of linked game interface cards installed in each of the plurality of electronic gaming machines.

10. A method according to claim 9, wherein the characteristics of each of the linked game interface cards define the linked games that the linked game interface card is configured to provide.

11. A controller configured to provide a plurality of virtual jackpot controllers, the controller being in communication with a plurality of electronic gaming machines, the controller including:

at least one processor; and at least one memory module containing computer executable code that, when executed via the at least one processors, configures the controller to:

maintain data representative of a selection of a linked game for each of a plurality of virtual jackpot controllers, the linked game selected from a set of available linked games;

automatically identify a set of the plurality of electronic gaming machines that are compatible in that the electronic gaming machines are equipped with hardware to interact with the linked game selected for each of the plurality of jackpot controllers from a group of electronic gaming machines equipped with hardware to interact with the linked game selected for each of the plurality of virtual jackpot controllers and electronic gaming machines not equipped with hardware to interact with the linked game selected for each of the plurality of virtual jackpot controllers, at least one set including one or more compatible electronic gaming machines that are not associated with the virtual jackpot controller, receive one or more selections of one or more electronic gaming machines to be associated with one of the plurality of virtual jackpot controllers after the set of the plurality of electronic gaming machines that are compatible with the one of the plurality of virtual jackpot controllers is automatically identified; and simultaneously execute selected linked games of each of the plurality of virtual jackpot controllers in respect of the associated electronic gaming machines.

12. A controller according to claim 11, wherein the at least one memory module contains computer executable code that, when executed via the at least one processor, configures the controller to cause either the set of electronic gaming machines that are compatible with the selected linked game for one of the virtual jackpot controllers or a set of virtual jackpot controllers having linked games for which one of the electronic gaming machines is compatible to be displayed.

13. A controller according to claim 11, including a repository of game data for the set of available linked games, wherein the set of available linked games includes at least one standard progressive jackpot and at least one mystery progressive jackpot.

14. A controller according to claim 13, wherein at least one of the virtual jackpot controllers is configured to provide a standard progressive jackpot linked game, and at least one of the virtual jackpot controllers is configured to provide a mystery progressive jackpot linked game.

15. A controller according to claim 11 wherein the at least one memory module contains computer executable code that, when executed via the at least one processor, configures the controller to maintain data indicative of a linked game includes data indicative of a game type and data indicative of game operational parameters.

16. A controller according to claim 15, wherein the at least one memory module contains computer executable code that, when executed via the at least one processor, configures the controller to receive a unique identifier for a linked game having the game type and the game operational parameters.

17. A controller according to claim 11, wherein the controller is configured to simultaneously provide up to n virtual jackpot controllers, wherein $n \geq 4$.

18. A controller according to claim 11, wherein automatically identifying a set of the plurality of electronic gaming machines that are compatible with the selected linked game includes determining characteristics of linked game interface cards installed in the plurality of gaming machines.

19. A controller according to claim 18, wherein the characteristics of each of the linked game interface cards define the linked games that the linked game interface card is configured to provide.

* * * * *